June 22, 1937.  A. V. E. C. GUILBERT  2,084,527
DYNAMO AND DYNAMO INSTALLATION
Filed Sept. 21, 1933
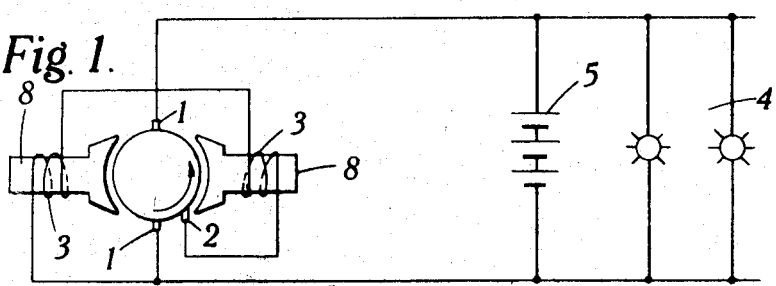
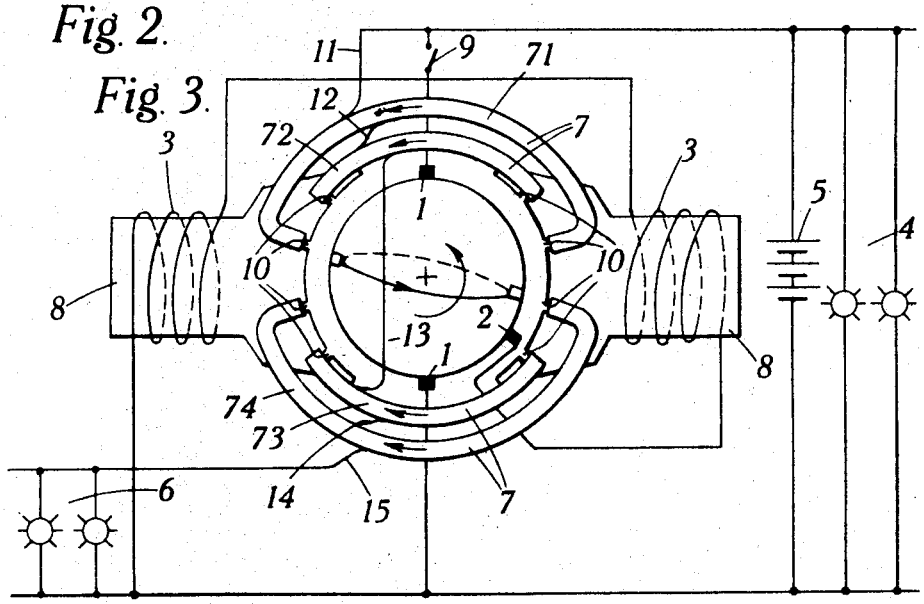
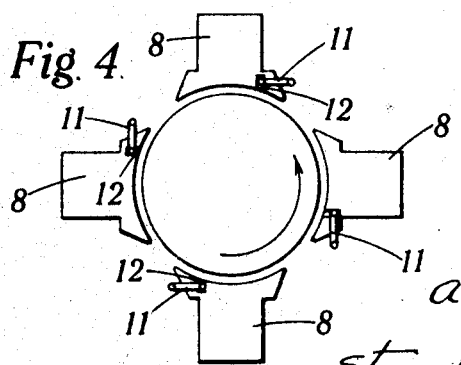
INVENTOR
A. V. E. C. Guilbert,
BY
Stone, Boyden & Mack,
ATTORNEYS Patented June 22, 1937

2,084,527

UNITED STATES PATENT OFFICE 2,084,527

DYNAMO AND DYNAMO INSTALLATION

André Vincent Ernest Cyrille Guilbert, Paris, France

Application September 21, 1933, Serial No. 690,402
In France September 24, 1932

3 Claims. (Cl. 171—313)

The invention relates to improvements in installations employing dynamos of the three-brush type and in the construction and arrangement of such dynamos themselves.

Dynamos of the "three-brush" type possess the well-known property of giving a constant output current for a relatively wide scale of speeds, on the condition that the voltage at the terminals is exactly determined and maintained at a constant value, such as by means of a battery of accumulators. This property is obtained by means of a shunt excitation connected between a normal brush corresponding to a neutral line and an auxiliary brush mounted at the same level as a conductor situated beneath the leading pole tip of the succeeding pole.

The distortion of the charging magnetic flux, due to the transverse reaction of the armature, which is variable for a same current in the armature with the value of this flux, causes, for a same voltage at the terminals of the dynamo, a progressive reduction in the voltage of the excitation current when the speed increases, whence the desired regulating effect on the output current.

It is thus necessary to obtain equality between the power of the dynamo, the charging power of the battery and the power required under permanent working conditions.

One object of the present invention is to avoid the use in such installations of a dynamo such as defined above Other objects and advantages of the present invention, together with particular constructional details of various embodiments thereof, will be more clearly understood from the following description given by way of example with reference to the accompanying drawing, in which:

Fig. 1 represents diagrammatically the usual connections employed for "three-brush" dynamos.

Fig. 2 represents diagrammatically the improved connections according to the invention.

Fig. 3 represents diagrammatically one form of realization of the compensating means.

Fig. 4 represents diagrammatically a second simplified form of realization of the compensating means.

It will be seen from the following that the invention permits of utilizing a dynamo having a power which is greatly superior to the charging power of the battery, of obtaining under permanent operating conditions from the two circuits the whole of the power which can be furnished by the dynamo and of only requiring from the latter, when no consuming device is in use, the charging power of the battery.

Referring to the hitherto proposed arrangement of Fig. 1, the normal brushes of the dynamo are shown at 1, the "third" brush at 2, the inducing windings at 3, whilst 4 is the consuming circuit and 5 the battery of accumulators. In the arrangement according to the invention of Fig. 2, however, there is provided a second consuming circuit 6 and in series therewith a compensating winding 7 mounted on the field poles 8, as shown more particularly in Figs. 3 and 4, and which is intended to neutralize the effects of the transverse reaction of the armature for the current flowing in the second circuit 6. The brushes 1, mounted on the neutral line, and the "third brush" 2 which is out of line with regard to the brushes 1, are arranged in the same manner in Figs. 1 and 2, as well as the inducing windings 3 and the first consuming circuit 4, with which are mounted in parallel the dynamo and the battery of accumulators 5, and a make-and-break device 9 is provided for disconnecting the dynamo from the circuits 4 and 6.

As a result of the use of the compensating winding 7, no disturbance will occur in the first circuit with regard to the normal functioning of the "three-brush" dynamo, due to the fact that the distribution of the field in the air gap and of the potentials on the collector remains only a function of the current which flows in this first circuit.

Theoretically, the compensation is obtained in well-known manner by arranging in slots 10 provided in the pole pieces a distribution of ampere turns which is identical but opposed to that of the armature. Fig. 3 shows clearly the manner in which this method of winding is obtained. In this figure, the numerals 1, 2, 3, 4, 5, 6, 7, 8 and 9 indicate the same parts as in Fig. 2. It will be seen that the compensating winding 7 is provided in slots 10 formed in the faces of the pole pieces 3 adjacent the air gap between the pole pieces 3 and the armature of the dynamo. The part 71 of the compensating winding is electrically connected to the circuit 4 by the conductor 11, and to the part 72 of the winding 7 by the conductor 12. The part 72 is connected to part 73 by the conductor 13, the part 73 is connected to part 74 by the conductor 14 and the part 74 is connected to the circuit 6 by the conductor 15. The arrows indicate the direction of the currents in the parts of the compensating winding and in the conductors of the armature.

It is known in effect that the transverse reaction of the armature weakens the field in the air gap under the leading pole tips of the poles and strengthens it on the contrary under the trailing pole tips. In the present case, the zones where the compensation must be felt are essentially the leading pole tips under which is induced the electro-motive force supplying the excitation. This remark may result in the fact that only a partial localized compensation at the level of the leading pole tips is effected. This compensation may also be realized in a simple manner by means of a single winding 11 on the pole, this winding 11 passing through a single slot 12 as represented in Fig. 4.

The increase in the flux at the level of the trailing pole tips caused by the passage of the current of the second circuit 6 in the armature and due to the absence of compensation in this place is not considerable, even at great speeds, due to the saturation of the teeth of the armature under these pole tips and the increase in the electro-motive force of the dynamo which results therefrom permits of reducing somewhat the compensating ampere turns of the windings 11 of Fig. 4. The compensation thus established is thus doubly economical and constitutes an important improvement according to the present invention. It is not necessary that compensating windings should be placed on all of the poles.

It will be realized that the comparison of the partial compensation to a sort of compound connection only relating to a fraction of the pole piece should be avoided. A classical compound connection relating to the whole of the pole has for object to render the functioning of the "three-brush" dynamo theoretically independent of the current flowing in the second circuit for a single speed in the neighbourhood of which this last solution although imperfect may be considered acceptable.

It will be understood that the embodiments above described have been given by way of example and that the invention is only limited insofar as is necessitated by the prior art and the spirit of the appended claims.

I claim:—

1. In combination, a dynamo equipped with a pair of main brushes and a third brush, and having pole pieces excited by windings shunted across one of said main brushes and said third brush, a first consuming circuit fed by said main brushes and containing a source of voltage, a second consuming circuit in parallel with the first but containing no source of voltage, and means for neutralizing that portion of the armature re-action which is due to the current flowing in said second consuming circuit, said means comprising a compensating winding connected in series with said second circuit and disposed in slots on the faces of said pole pieces at least in the region of the leading pole tips.

2. In combination, a dynamo equipped with a pair of main brushes and a third brush, and having pole pieces excited by windings shunted across one of said main brushes and said third brush, a first consuming circuit fed by said main brushes and containing a source of voltage, a second consuming circuit in parallel with the first but containing no source of voltage, and means for neutralizing that portion of the armature re-action which is due to the current flowing in said second consuming circuit, said means comprising a compensating winding connected in series with said second circuit and distributed in slots over the faces of said pole pieces.

3. In combination, a dynamo equipped with a pair of main brushes and a third brush, and having pole pieces excited by windings shunted across one of said main brushes and said third brush, a first consuming circuit fed by said main brushes and containing a source of voltage, a second consuming circuit in parallel with the first but containing no source of voltage, and a compensating winding in series with said second circuit and disposed adjacent the air gap between said pole pieces and armature, said compensating winding being so proportioned and arranged that the ampere turns due thereto are substantially equal but opposed to those due to the flow of the same current in the armature.

ANDRÉ VINCENT ERNEST
CYRILLE GUILBERT.